(12) United States Patent
Peel

(10) Patent No.: US 7,762,764 B2
(45) Date of Patent: Jul. 27, 2010

(54) TURBOMACHINE

(75) Inventor: Philip John Peel, Hornussen (CH)

(73) Assignee: ALSTOM Technology Ltd., Baden (CH)

( * ) Notice: Subject to any disclaimer, the term of this patent is extended or adjusted under 35 U.S.C. 154(b) by 614 days.

(21) Appl. No.: 11/764,256

(22) Filed: Jun. 18, 2007

(65) Prior Publication Data

US 2008/0003102 A1    Jan. 3, 2008

(30) Foreign Application Priority Data

Jun. 30, 2006   (CH) .................................. 1052/06

(51) Int. Cl.
*F01D 25/26* (2006.01)
(52) U.S. Cl. .................................... 415/108; 415/214.1
(58) Field of Classification Search ................. 415/108, 415/213.1, 214.1
See application file for complete search history.

(56) References Cited

U.S. PATENT DOCUMENTS 6,607,352 B1 *   8/2003   Crane et al. .................. 415/108

FOREIGN PATENT DOCUMENTS

| CH | 315427   | 8/1956  |
|----|----------|---------|
| DE | 10878    | 12/1955 |
| DE | 1812488  | 9/1970  |
| DE | 19806809 | 3/1999  |
| EP | 1022439  | 7/2000  |

OTHER PUBLICATIONS

Search Report for German Patent App. No. 10 2007 027 396.9 (Mar. 18, 2009).
Search Report for Swiss Patent App. No. 1052/06 (Nov. 27, 2006).

* cited by examiner

*Primary Examiner*—Richard Edgar
(74) *Attorney, Agent, or Firm*—Cermak Nakajima LLP; Adam J. Cermak

(57) ABSTRACT

A turbomachine, especially a steam turbine (10), has an inner casing (15a) and an outer casing (17a), which concentrically encompass a rotor which is rotatable around a machine axis, wherein the outer casing (17a) encloses the inner casing (15a) with a radial space (d), and at least the inner casing (15a) is divided in a parting plane (22) into two casing halves (15a) which can be releasably interconnected by flanges (18) which are attached to the casing halves (15a), and wherein the casing halves (15a) of the inner casing (15a) have a thickening (20) in the region between the flanges (18). A change of the interspace between the casings is largely avoided by the outer casing (17a), in the region of the thickening (20) of the inner casing (15a), being adapted to the thickening (20) so that the radial space (d) between inner casing (15a) and outer casing (17a) outside the flanges (18, 19) is largely constant over the casing circumference.

5 Claims, 1 Drawing Sheet

TURBOMACHINE

This application claims priority under 35 U.S.C. §119 to Swiss application no. 01052/06, filed 30 Jun. 2006, the entirety of which is incorporated by reference herein.

BACKGROUND

1. Field of Endeavor

The present invention refers to the field of turbomachines.

2. Brief Description of the Related Art

In turbines, especially steam turbines, a major problem is associated with the use of a split inner casing which is connectable by means of flanges, which problem is created as a result of the non-symmetrical casing geometry on account of the flanges. During the transition phases, and also in normal operation, unequal deformations of the inner casing occur as a result of the non-symmetrical geometry. The consequentially resulting gap between the stationary blade components, which are directly attached to the casing, and the rotating components, which are mounted on the rotor, is variable as a result. In order to prevent rubbing of the components, a minimum dimension for the gap, which occurs at the outset during assembly, has to be observed, which, during operation, leads to large regions with a greatly widened gap width on the casing circumference. The consequence of this is an increased steam leakage and an impaired blade action which is associated with it.

It has already been proposed in EP-A1-1 022 439 to homogenize the deformations of the casing which occur, by means of a variable thickness of the inner casing, in order to achieve a lessening of the gap problems. The outer casing, which concentrically encompasses the inner casing, remains unchanged in the case of this solution, which leads to unwanted changes in the interspace between the two casings.

SUMMARY

One of numerous aspect of the present invention includes creating a turbomachine in which the casing deformation is homogenized, without disadvantageous changes in the configuration of the casing interspace resulting.

According to an embodiment exemplifying principles of the present invention, the inner casing has a thickening in the region between the flanges, and that the outer casing, in the region of the thickening of the inner casing, is adapted to the thickening so that the radial space between inner casing and outer casing outside the flanges is largely constant over the casing circumference. As a result of this, it is ensured that the interspace between the two casings is only insignificantly changed on account of the thickening.

Another aspect of the present invention includes that the outer casing, for adapting to the thickening of the inner casing, has a corresponding deformation in the region of the thickening, wherein especially the wall thickness of the outer casing in the region of the deformation is constant.

Yet another aspect of the present invention includes that the thickening is formed symmetrically to a center plane which is perpendicular to the parting plane. As a result of this, the disturbance of the casing symmetry on account of the thickening is comparatively minor.

It is especially favorable, according to a further aspect of the present invention, if the thickening is created by a uniform increase and decrease of the wall thickness of the inner casing in the circumferential direction.

BRIEF DESCRIPTION OF THE DRAWINGS

The invention is to be subsequently described in detail based on exemplary embodiments in connection with the drawing. In the drawings.

DETAILED DESCRIPTION OF EXEMPLARY EMBODIMENTS

Figure 1:
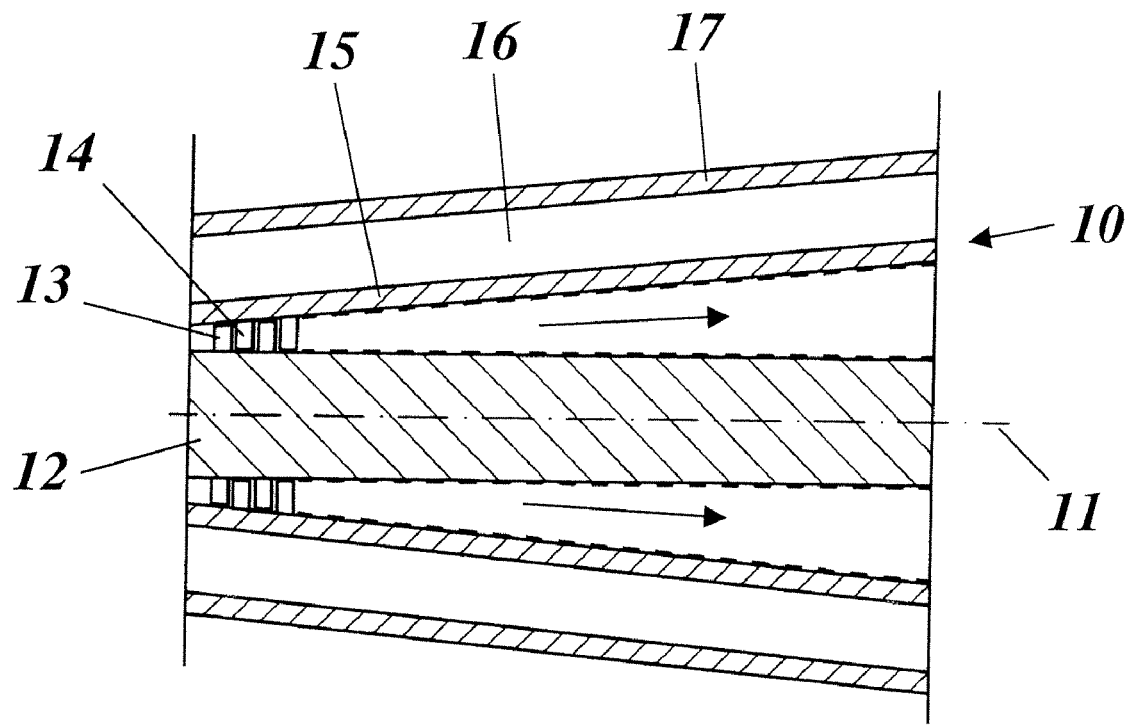
FIG. 1 shows a longitudinal section through a schematically represented steam turbine, with an inner casing and an outer casing, which concentrically encompass the rotor.

A longitudinal section through a schematically presented steam turbine, with an inner casing and an outer casing, is reproduced in FIG. 1. The steam turbine 10 includes a central rotor 12 which is rotatable around a machine axis 11. The rotor 12 is equipped with a plurality of rows of rotor blades 13 which are arranged in series in the flow direction of the steam (arrows), of which only two rows are shown in FIG. 1. The rotor 12 is concentrically encompassed by an inner casing 15 which encloses the rows of rotor blades 13, forming a gap. A plurality of rows of stator blades 14, which alternate with the rotor blades 13, are arranged in a stationary manner on the inner side of the inner casing 15, and with which the rotor 12 also form a gap. The inner casing 15 is concentrically encompassed with a space by an outer casing 17 so that an annular interspace 16 is created between the two casings 15, 17.

Figure 2:
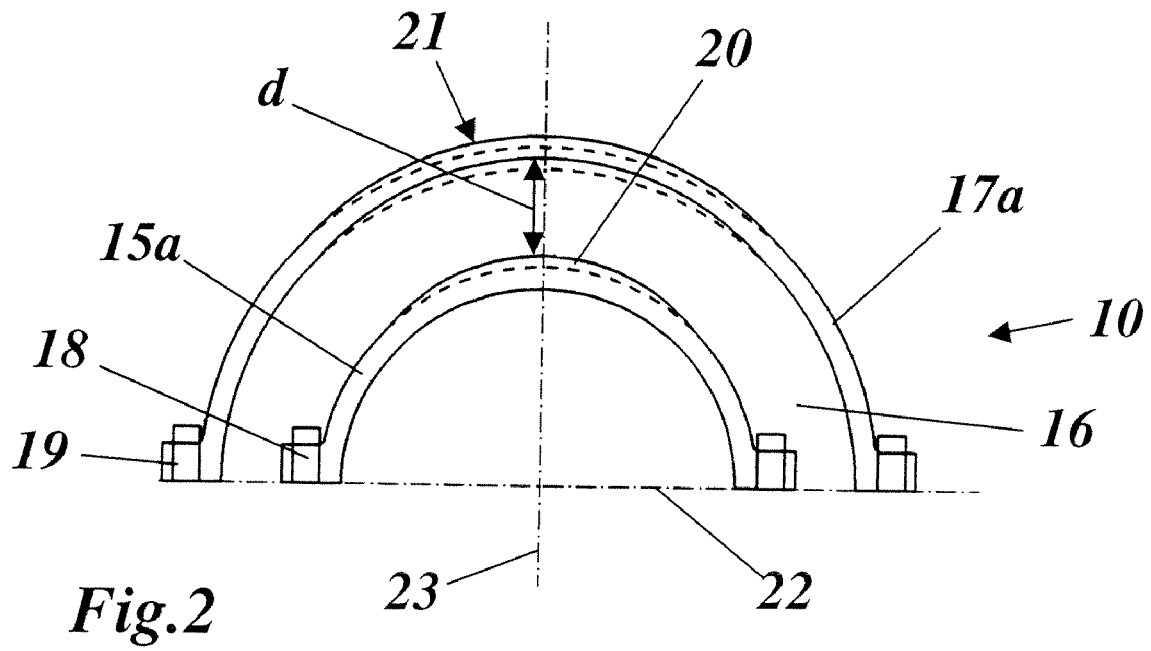
FIG. 2 shows a cross section through the upper half of the casing of a turbine according to FIG. 1, with a casing modification according to a preferred exemplary embodiment of the invention.

According to FIG. 2, at least the inner casing 15 is divided in a parting plane 22 into two separate casing halves, of which only the upper casing half 15a is shown in FIG. 2 (the lower casing half, which is not shown, can be especially mirror-symmetrically formed with regard to the parting plane 22). The outer casing 17 can similarly also be divided in the parting plane 22 into two separate casing halves, as this is exemplarily shown in FIG. 2 with reference to the upper casing half 17a. The casing halves 15a, 17a are equipped with flanges 18, 19 at the separation points, which enable a releasable connection of the casing halves 15a, 17a.

In order to compensate for the disturbances in the geometry of the inner casing 15 which are caused by the flanges 18, a thickening 20 is provided on the casing halves 15a of the inner casing 15 between the flanges 18 and is formed preferably symmetrically to a center plane 23 which is perpendicular to the parting plane 22 and leads through the machine axis 11. The dashed line in the region of the thickening 20 in this case shows the present, constant wall thickness of the inner casing 15 without the thickening. The thickening 20 is especially created by a uniform increase and decrease of the wall thickness of the inner casing 15 in the circumferential direction, as this is easy to see with reference to a comparison of the dashed outline and continuous outline in FIG. 2.

In order to now leave the interspace 16, with the space d between the two casings 15, 17, largely unchanged in the region of the thickening 20, despite the thickening 20, the outer casing 17 is deformed in this circumferential region with constant wall thickness, so that the space d between the casings in the circumferential direction is largely constant. The deformation 21 of the outer casing 17 is to be seen in FIG. 2 as a difference between the dashed lines and the continuous lines.

List Of Designations
10 Steam turbine
11 Machine axis
12 Rotor
13 Rotor blade
14 Stator blade
15 Inner casing
15a Upper casing half (inner casing)
16 Interspace
17 Outer casing half
17a Upper casing half (outer casing)
18, 19 Flange
20 Thickening (inner casing)
21 Deformation (outer casing)
22 Parting plane
23 Center plane
d Space While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A turbomachine comprising:
   a rotor rotatable around a machine axis;
   an inner casing which concentrically encompasses the rotor;
   an outer casing which concentrically encompasses the inner casing;
   wherein the outer casing encloses the inner casing at a radial space d, and at least the inner casing is divided at a parting plane into two casing halves configured and arranged to be releasably interconnected by, and including, flanges attached to the casing halves, and wherein the casing halves of the inner casing have a thickening in the region between the flanges;
   wherein the outer casing, in the region of the thickening of the inner casing, is adapted to the thickening so that the radial space d outside the flanges is constant over the casing circumference.

2. The turbomachine as claimed in claim 1, wherein the outer casing, for adapting to the thickening of the inner casing, has a corresponding deformation in the region of the thickening.

3. The turbomachine as claimed in claim 1, wherein the wall thickness of the outer casing in the region of the deformation is constant.

4. The turbomachine as claimed in claim 1, wherein the thickening is formed symmetrically to a center plane which is perpendicular to the parting plane.

5. The turbomachine as claimed in claim 4, wherein the thickening comprises a uniform increase and decrease of the wall thickness of the inner casing in the circumferential direction.

* * * * *